Oct. 9, 1956  J. S. BALLARD  2,765,899
DRY FEEDER
Filed April 29, 1952
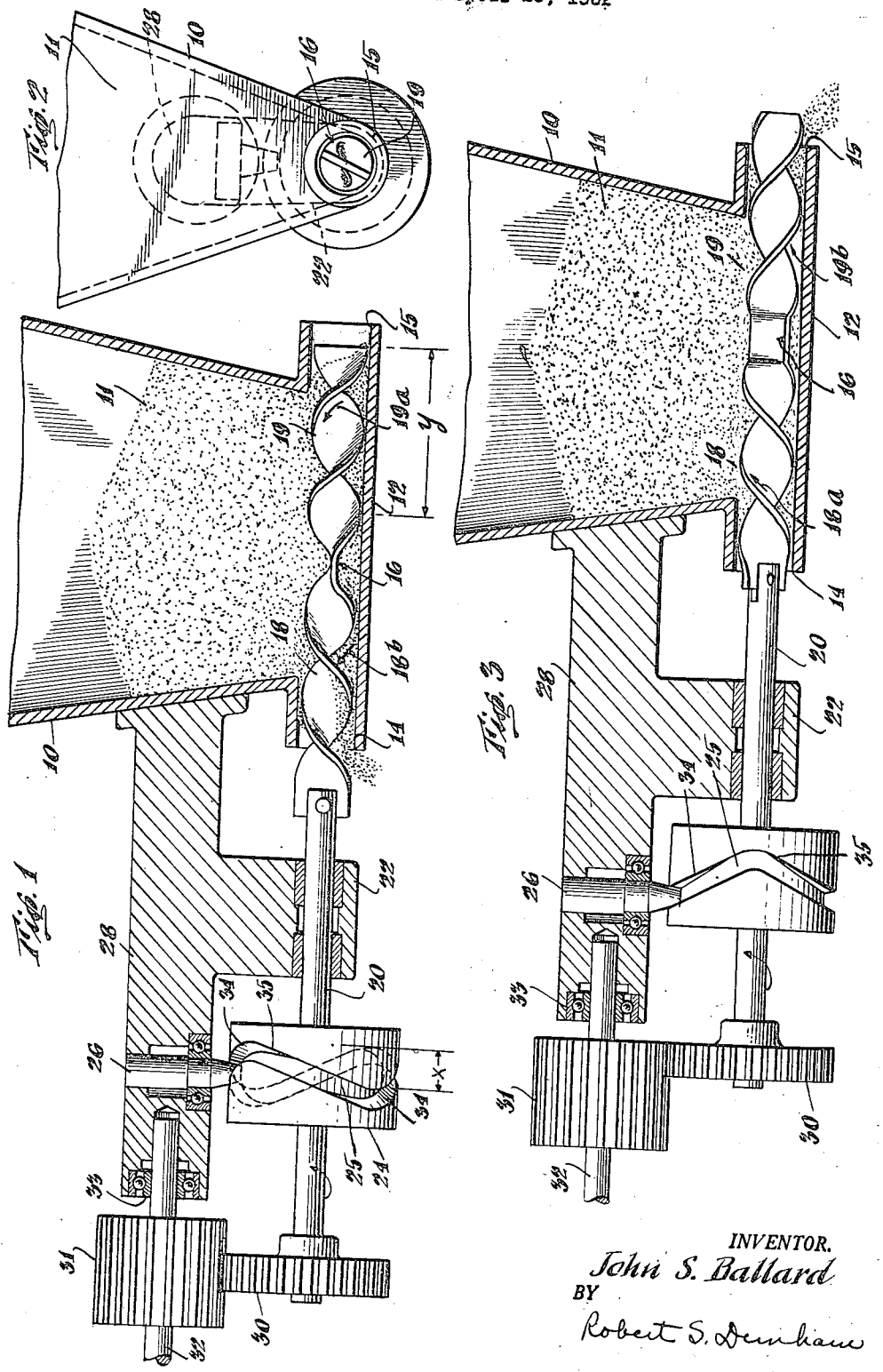
INVENTOR.
John S. Ballard
BY
Robert S. Dunham
ATTORNEY

United States Patent Office

2,765,899
Patented Oct. 9, 1956

2,765,899

DRY FEEDER

John S. Ballard, Little Falls, N. J., assignor to Wallace & Tiernan Incorporated, a corporation of Delaware Application April 29, 1952, Serial No. 284,993

12 Claims. (Cl. 198—64)

This invention relates to dry feeding apparatus, particularly of the screw type, for feeding or discharging dry, divided material, especially finely divided solids, but including various divided solids in powdered, granular or lump form, of which some examples are dry chemicals, other dry powders, flour, grain and the like. The present improvements are more specifically directed to screw feeders of the type wherein the screw is arranged to advance the material through a discharge opening in a vessel to which the material is supplied, e. g. a vessel of the nature of a hopper, the screw operation being of the type wherein this element is rotated and axially advanced in one direction to thread it into the body of divided material, and is then axially advanced in an opposite direction to push or carry a quantity of the material through the discharge opening. While apparatus of this general type, which is in many respects very successful, has been heretofore known and manufactured, a primary object of the present invention is to afford a much simpler and mechanically more convenient device which is nevertheless fully effective to afford a steady, more or less continuous discharge of the supplied solids.

A further object is to afford a feeder of the reciprocating screw type in which a novel relation of rotation and reciprocation is maintained relative to the configuration of the screw, for optimum results in both directions of screw travel, i. e. for high feeding efficiency with simplicity of mechanism.

Another object is to provide an improved screw feeder which may be free of bearings or sealed-shaft arrangements that are exposed to the material under feed, while at the same time accomplishing a satisfactory and efficient discharge of such material. Yet another object is to afford a novel feeding device having an axially reciprocated screw, providing for substantially continuous discharge of the material, especially by effectuating such discharge during strokes of the screw in both axial directions.

More particularly, in its presently preferred form, the invention is designed to provide a reciprocating screw feeder having an unusually simple mechanical drive, of a rugged and non-complicated sort (in comparison with certain previous feeders), the feeder particularly involving a relation between rotary and reciprocating motions which affords maximum efficiency of screw function in both directions. The preferred structure, as indicated above, likewise may entirely avoid bearings or seals which tend to wear rapidly or otherwise deteriorate because of abrasive or clogging action of solid particles of the adjacent material, the invention also preferably including a double screw and discharge opening arrangement such that an effectively continuous output of divided solid material is achieved with essentially simplified motion of the mechanism.

To these and other ends, including such further objects and advantages as will become apparent or are incidental to the use of the described apparatus, a suitable embodiment of the invention is disclosed below and shown in the accompanying drawings, by way of illustration of the novel features and principles.

Referring to the drawings:

Fig. 1 is an elevational view, with certain parts in central, vertical section, of the feeder apparatus, with the mechanism shown as discharging the divided material from the left-hand one of two openings;

Fig. 2 is an end elevation of the apparatus, i. e. viewing the right-hand end of Fig. 1; and Fig. 3 is an elevational view similar to Fig. 1, but showing the mechanism just as it has finished discharging material from the right-hand discharge opening and is about to start discharging from the left-hand opening.

As shown, the apparatus includes a suitable vessel such as the hopper 10, which receives and holds an appropriate supply of the dry, divided material 11 which is to be fed. The hopper converges at its bottom to a horizontal trough or tubular-shaped structure 12 which terminates at its opposite ends in corresponding, open discharge tubes 14, 15.

Arranged lengthwise in the trough 12 and conveniently projecting into the discharge passages 14, 15, a feed screw assembly 16 is provided, comprising two screws or screw sections 18, 19 respectively adjacent the tubular openings 14, 15. The screw sections 18, 19 which may be considered as having a common shaft (represented here simply by the central or axial portion of the twisted plate structure of which the screw may for simplicity be constituted) are of opposite hand, i. e. having helical pitch or helix angles in respectively opposite directions. Specifically the hand of the screw 19 is such that upon displacing the assembly axially away from the opening 15, the screw tends to thread into the body of material 11, while the hand of the screw 18 is similarly such as to thread into the material upon movement of the assembly away from the opening 14, i. e. to the right as seen in Fig. 1. The screw assembly further includes a driving and supporting shaft section 20, secured to the outer end of the screw section 18, the connection of the enclosed screw portions to the drive shaft section 20 being thus effected through one of the discharge tubes or openings, e. g. opening 14. Thus the entire screw arrangement is wholly mounted by and upon a shaft which extends from a region well outside the hopper 10 and the trough 12, and in effect extends into the latter through one of its openings, for the entire support and drive of the screw.

While other means for reciprocating and rotating the screw in the preferred relation to the helix angle of its threads may be employed in some cases, one particularly convenient and simple mechanism is illustrated by way of example. Thus the shaft section 20, which may be supported in suitable bearings carried by stationary structure 22, has mounted upon it a cylindrical cam 24 having a circumferential groove or cam track 25 which is engaged by a cam roller 26. The roller 26 is journalled to rotate on a vertical axis, in suitable rigid structure 28, constituting (with the bearing support 22) a further stationary part of the apparatus, the support 28 being conveniently connected to the hopper 10. The circumferentially inclined path of the cam groove 25 is such, in cooperation with the cam roller 26, as to impart an axial reciprocation to the shaft 20 when the latter is rotated, the bearing structure 22 being such as to accommodate both axial sliding and free rotation of the shaft.

To constitute driving means for imparting rotation to the shaft 20, one example of a suitable instrumentality comprises a gear 30 on the shaft 20, meshing with a wide gear 31 on a power shaft 32, which is conveniently journalled as at 33 in one end of the support structure 28 and which is connected to a motor or other source of rotary power, not shown. The gear 31 is of suitable width relative to the mating gear 30 as to permit endwise motion of the shaft 20, i. e. through its cycle of axial reciprocation, while maintaining mesh of the gears, the teeth of the gear 30 thus sliding lengthwise along those of the gear 31.

It may be assumed for convenience of description that the shafts 32 and 20 are continuously rotating in the direction of the arrows, the shaft 20 thus turning counterclockwise as seen at its left-hand end. Under such circumstances, the screw 19 is constructed to have a right-hand helical pitch, and the screw 18 a corresponding left-hand pitch. In accordance with a preferred feature of the invention, the helix angles of the screws and the directions of the cam groove 25 are mutually such that as each screw is alternately retracted into the material, its threads or flights move essentially only along their own surfaces relative to the material, while on the reverse or outward stroke of each screw, the resultant displacement of the screw thread is in a direction essentially perpendicular to its face, i. e. directly against the chemical or other material under feed. Thus specifically in the arrangement shown, the helix angle at the outer diameter of each of the sections 18, 19 of the feed screw is approximately 45°, the helix angles of the screws being in effect approximately at a right angle to each other, when the opposite direction or hand of their respective threads is considered. The groove 25, e. g. as designed to accomplish two complete cycles of screw movement in each revolution (each cycle comprising motion in one direction and then back in the other direction), thus consists of four circumferentially successive portions each extending angularly or in a quarter-helical turn about the surface 24, and joined by bends in their common path, alternate portions 34 of such track being sloped to advance the shaft 20 and screw assembly toward the left and the other portions 35 being sloped to advance the parts to the right. In some cases the cam groove may be designed to produce only one cycle, or more than two cycles of screw motion.

The operation and unusually effective functioning of the apparatus may now be explained. Assuming that the hopper 10 is appropriately filled with material 11 and that the shafts 32 and 30 are continuously rotated, the screw assembly 16 is similarly subjected to continuous rotation, while it is displaced axially in alternate directions by the cam 24 and roller 26. Specifically, as indicated above, each left-hand helical portion 34 of the cam groove, effective to move the screw from its right-hand position to its left-hand position, i. e., the position shown in Fig. 1, has a helix angle such that any point in the outer diameter of the feed screw moves in the path of a helix having an approximately 45° helix angle. Likewise each of the other, alternate helical portions 35 of the cam groove, which serve to displace the screw assembly from the left to the right-hand position, i. e., the position shown in Fig. 3, has a helix angle that likewise causes each outer point on the feed screw to move in a 45° helix, i. e., in a helix angle perpendicular to that followed in motion to the left. In order to secure this result, the pitch of each of the cam portions 34, 35 is made substantially equal to the pitch of the screw sections 18 and 19. In other words, if each of the cam portions 34, 35 were extended to form a complete turn of a helix, that complete turn would have a pitch substantially equal to the pitch of the screw sections 18 and 19. The ratio of the longitudinal travel distance of the shaft 20 to the pitch distance of the screw sections 18, 19 is made equal to the ratio of the angle through which the screw rotates during that longitudinal travel to 360°. Considering the relationships of the ratios just stated as applied to the specific structure shown in the drawing, it is first necessary to identify the pitch distance of the screw sections. The screw sections 18 and 19 are, at least in effect, double threaded, since each has two threads crossing any plane at right angles to its axis. The pitch distance of these screw sections is the pitch distance of one of the two threads. For example, referring to Fig. 1, the pitch distance of the screw section 19 may be described as the distance $y$ between the point where the thread is adjacent the bottom of trough 12 just to the right of the center of screw assembly 16, and the point where the same thread is again adjacent the bottom of trough 12 at the right-hand end of screw section 19. The longitudinal travel distance of shaft 20 is determined by the contour of cam 24 and is the distance shown at $x$ in the drawing. The cam 24 is contoured so that the shaft rotates 90° during each longitudinal travel through the distance $x$. The ratio of 90° to 360° is 1:4. Consequently, the ratio of the longitudinal travel distance $x$ to the pitch distance $y$ of the screw should also be substantially 1:4. A reference to the drawing will show that this ratio is correct. In consequence, as the assembly moves to the right (Fig. 3) the left-hand screw 18 threads directly into the surrounding solid material, and essentially the only motion of the threads of this screw section is along their surfaces as indicated by the arrow 18a. That is to say, the screw 18 thus threads itself into the substance without materially disturbing the latter since all surfaces of the screw move parallel to the mating surfaces of the surrounding material. At the same time, the right-hand screw section 19 pushes the material around and outwardly with itself, in a highly efficient manner, since the effective surfaces of this screw 19 move substantially perpendicular to the mating surfaces of the surrounding material, e. g. as indicated by the arrow 19b. During this entire rightward stroke of the screw assembly, material is thus continuously advanced and discharged through the opening 15, e. g. to fall into a receiving conveyor, or into a stream of liquid or other solid material, or yet other receiving means, omitted from the drawing for the sake of clarity.

On the stroke of the assembly to the left, while the cam roller 26 is traversing a groove section 34, the screws 18 and 19 function in exactly the reverse manner. As seen in Fig. 1, the screw 19 then threads effectively and simply into the material, with its surfaces traveling parallel to the mating surfaces of the latter, along the arrow 19a. Likewise, the screw 18 pushes the substance around and outwardly, by motion of the screw thread perpendicular to the material as shown by the arrow 18b. In Fig. 1, the parts are shown at the center of the leftward path of travel. Throughout this stroke, the material is continuously discharged through the left-hand opening 14, again to fall into the same receiving vessel, conveyor or other means (not shown). The described cycles follow each other successively and immediately, so that flow of material ultimately occurs at the openings 14 and 15 with corresponding essentially continuous deposit in the receiving locality below the apparatus shown.

In the manner described, a highly efficient feed of dry chemical or other material is obtained, the design and arrangement of parts being such that the rate of discharge is approximately proportional to the speed of rotary drive, e. g. through a considerable range of such speeds. It will be understood that the arrangement of the hopper 10 is preferably such as to keep the trough section 12 filled with the material at all times, appropriate agitating or like means of known character (not shown) being provided for the upper hopper section if the material is not sufficiently free-flowing to prevent arching above the trough. As illustrated, the screw sections 18 and 19 may have a slight clearance in the trough and outlet tubes 14, 15; they may be disposed to remain wholly within the trough and tubes, or conveniently as shown, to project alternately through the latter at the respective ends of the feeding strokes. While in most cases the shaft 32 is continuously rotated, and a useful feature of the device is its adaptability to drive by continuous rotation, it will be understood that the drive can in some cases be intermittent, the periodic interruptions being, if desired, in timed or other relation to the axial strokes of the shaft 20.

It will be understood that the above-expressed equality between certain ratios (which were defined as the ratio of travel distance to pitch distance and the ratio of angular turning to a full revolution) applies specifically to the situation where the screw, or each screw, has a helix angle of approximately 45° at its outer diameter, i. e. as in the illustrated example of apparatus. Where other helix angles are selected, being such in the case of the double screw assembly that the helix angle of each screw is at a right angle to that of the other (as mentioned hereinabove), the angle through which the screw or assembly should turn during its stroke in one direction will manifestly differ (in a manner which will now be obvious) from the angle through which it should turn during the opposite stroke of equal axial length.

As will now be seen, the alternately parallel and perpendicular motions of the surfaces of the feed screw assembly relative to the surrounding material represent a feature of special advantage, in their unusual effectiveness for the accomplishment of the withdrawing and feeding functions of the screw, and for the attainment of such functions by relatively simple mechanism. There is essentially no unnecessary disturbance of the material on either stroke, the inward stroke serving only its desired function of repositioning the screw and the outward stroke serving most efficiently its opposite, desired purpose of advancing material toward and through the discharge opening. While a useful structure can be effected (including important features of the invention) with only a single screw section, for example particularly by omitting the section 19 and closing the passage 15, the double screw assembly affords substantially steady discharge of material from the hopper. Even with intermittent discharge as afforded by a single screw, however, a reliable feed is obtained, again proportional to the rate of driving rotation. In the latter case, moreover, the structure there preferably includes the described novel relationship of screw helix angle to the helical path of forward and backward rotation, i. e. the helix angle of the screw and the pitch of the cam groove 25 or equivalent means being selected so that on the inward stroke the screw threads follow a path having a helix angle equal to their own such angle and on the outer stroke follow a helical path with an angle perpendicular to that which structurally characterizes them. In all embodiments, particularly including the preferred, double-acting arrangement shown, the apparatus is of unusual simplicity and effectiveness in mechanical respects, and advantageously free of parts likely to wear or deteriorate in normal operation.

It is to be understood that the invention is not limited to the specific apparatus herein shown and described, but may be embodied in other forms without departure from its spirit.

I claim:

1. Feeding apparatus comprising in combination, a vessel for material to be fed, having a pair of oppositely disposed discharge openings, screw means in the vessel between the openings and comprising a common shaft carrying a pair of feed screw portions of equal pitch and respectively opposite hand adjacent the respective openings, and driving means connected to said shaft for rotating and axially reciprocating said screw means positively in both directions, said driving means including means rotating both screw portions in the same direction during strokes of reciprocation in both axial directions, each screw portion having the helix of its thread disposed for threading such screw portion into the material during the axial stroke which displaces such screw portion inwardly from its adjacent opening.

2. Feeding apparatus comprising in combination, a vessel for material to be fed, having a pair of oppositely disposed discharge openings, screw means in the vessel between the openings and comprising a common shaft carrying a pair of feed screw portions respectively adjacent the openings, each of said screw portions having a helix angle of about 45° at its outer diameter, said screw portions being of opposite hand with their respective helix angles perpendicular to each other, and driving means connected to said shaft for rotating and positively axially reciprocating said screw means, including means for advancing the screw means helically during successive strokes in opposite directions, to move the periphery of the screw portions along helical paths respectively having helix angles of about 45°, perpendicular to each other to thread first one screw portion and then the other back from its opening into the material, while each time simultaneously advancing the opposite screw portion toward its opening with its thread surfaces moving perpendicularly against the material to effect discharge of material from such opening.

3. Apparatus as described in claim 2, wherein said shaft includes a portion extending through one of said openings to a locality outside the vessel, said screw means being wholly supported by said shaft and being adapted to advance material through the opening around the shaft, said driving means being connected to the shaft outside the vessel, for effecting the aforesaid rotation and axial reciprocation of the screw means.

4. Feeding apparatus comprising in combination, a vessel for material to be fed, having a pair of oppositely disposed discharge openings, screw means in the vessel between the openings and comprising a common shaft carrying a pair of feed screw portions of equal pitch and respectively opposite hand adjacent the respective openings, said shaft including a portion extending through one of said openings for support of the screw means externally of the vessel, and driving means connected to said shaft portion outside the vessel, for rotating and positively axially reciprocating said screw means, said driving means including means continuously rotating the screw means in a single direction of rotation, to turn both screw portions in said single direction during strokes of reciprocation in both axial directions, each screw portion having the helix of its thread disposed for threading such screw portion into the material during the axial stroke which displaces such screw inwardly from its adjacent opening.

5. Feeding apparatus comprising in combination, a vessel for material to be fed, having a discharge opening, a feed screw in the vessel to discharge material through the opening and having a predetermined helix angle at its outer diameter, and driving means for axially reciprocating the screw positively in both axial directions and for positively rotating the screw in the same rotational direction during both strokes of the reciprocation, said driving means including inward-stroke means for advancing the screw helically inward from the opening to move its periphery along a helical path having the same aforesaid helix angle, and outward stroke means for advancing the screw helically toward the opening to move its periphery along a helical path having a helix angle perpendicular to the helix angle of the screw.

6. Feeding apparatus comprising in combination, a vessel for material to be fed, having a discharge opening, a feed screw in the vessel to discharge material through the opening and having a helix angle of about 45° at its outer diameter, and driving means for axially reciprocating the screw positively in both axial directions and for positively rotating the screw in the same rotational direction during both strokes of the reciprocation, said driving means including inward-stroke means for advancing the screw helically inward from the opening to move its periphery along a helical path having the same aforesaid helix angle of about 45°, and outward-stroke means for advancing the screw helically toward the opening to move its periphery along a helical path having a helix angle of about 45° in opposite direction, perpendicular to the helix angle of the screw.

7. Feeding apparatus comprising in combination, a vessel for material to be fed, having a pair of oppositely disposed discharge openings, screw means in the vessel between the openings and comprising a common shaft carrying a pair of feed screw portions of respectively opposite hand adjacent the perspective openings, said screw portions having respective predetermined helix angles at their outer diameters which are approximately at a right angle to each other, and driving means connected to said shaft for axially reciprocating the screw means positively in both axial directions and for positively rotating the screw means in the same rotational direction during both strokes of reciprocation, said driving means comprising helical advancing means for moving the screw means helically to thread each screw portion into the material during the axial stroke in which such screw portion is advanced inwardly from its adjacent opening.

8. Feeding apparatus comprising in combination, a vessel for material to be fed, having a pair of oppositely disposed discharge openings, screw means in the vessel between the openings and comprising a common shaft carrying a pair of feed screw portions of respectively opposite hand adjacent the respective openings, said screw portions having respective predetermined helix angles at their outer diameters which are approximately at a right angle to each other, and driving means connected to said shaft for axially reciprocating the screw means positively in both axial directions and for positively rotating the screw means in the same rotational direction during both strokes of reciprocation, each screw portion having the helix of its thread disposed for threading such screw portion into the material during the axial stroke which displaces such screw portion inwardly from its adjacent opening, and said driving means including means for advancing the entire screw means helically during each axial stroke to move the periphery of the screw portion which is displaced inwardly from its opening in such stroke, along a helical path which has the same helix angle as said last-mentioned screw portion.

9. Feeding apparatus comprising in combination, a vessel for material to be fed, having a discharge opening, a feed screw within the vessel to discharge material through the opening, a drive shaft for said feed screw extending into said opening from a locality outside the vessel, said screw being wholly supported by said shaft and being adapted to advance material through the opening around the shaft, and means outside the vessel, connected to the end of the shaft outside said opening, for rotating and axially reciprocating the screw positively in both directions, alternately to thread the screw into the material and to draw the screw toward the opening for urging material through the latter, said screw having a predetermined helix angle at its outer diameter, said driving means comprising means for rotating the screw in the same single direction of rotation during both strokes of its reciprocation, and axial reciprocating means timed and arranged with said last-mentioned means, for advancing the screw helically on the inward stroke from the opening to move its periphery along a helical path having the same aforesaid helix angle, and for advancing the screw helically on the outward stroke toward the opening to move its periphery along a helical path having a helix angle perpendicular to the helix angle of the screw.

10. Feeding apparatus, comprising a vessel for material to be fed and having a discharge opening, a feed screw in the vessel and aligned with said opening to discharge material therethrough, said screw having a predetermined pitch, and driving means operatively connected to the screw including means for rotating the screw continuously and means for reciprocating the screw positively toward and away from said opening during its rotation, with said screw traveling in the direction of its thread during its movement away from the opening, said reciprocating means being connected to said rotating means and effective to reciprocate said screw longitudinally through a predetermined travel distance during a predetermined angular movement of the screw, the ratio of said travel distance to the pitch distance of the screw being substantially equal to the ratio of said angular movement to 360°.

11. Feeding apparatus as defined in claim 10, in which said reciprocating means comprises a cam having helically contoured portions, said helically contoured portions having substantially the same pitch as said screw.

12. Feeding apparatus, comprising a vessel for material to be fed, having a pair of oppositely disposed discharge openings, screw means in the vessel between the openings and comprising a common shaft carrying a pair of feed screw portions of equal pitch and respectively opposite hand adjacent the respective openings, and driving means operatively connected to the shaft including means for rotating the shaft continuously and means for reciprocating the shaft in both directions during its rotation alternately toward one opening and then toward the other, the threads of said screw portions being so related to the direction of shaft rotation that each screw portion travels in the direction of its thread during its movement away from its associated opening, said reciprocating means being connected to said rotating means and effective to reciprocate said shaft longitudinally through a predetermined travel distance during a predetermined angular movement of the shaft, the ratio of said travel distance to the pitch distance of the screw portions being substantially equal to the ratio of said angular movement to 360°.

References Cited in the file of this patent

UNITED STATES PATENTS

| | | |
|---|---|---|
| 1,975,015 | Murphy | Sept. 25, 1934 |
| 2,200,831 | Bliss et al. | May 14, 1940 |
| 2,205,596 | Lower | June 25, 1940 |
| 2,541,742 | Booth | Feb. 13, 1951 |